United States Patent [19]
Jenkins et al.

[11] Patent Number: 6,029,183
[45] Date of Patent: *Feb. 22, 2000

[54] TRANSFERABLE CORE COMPUTER

[75] Inventors: Michael D. Jenkins, Manassas; John F. Moynahan, Fairfax, both of Va.

[73] Assignee: Xybernaut Corporation, Fairfax, Va.

[ * ] Notice: This patent is subject to a terminal disclaimer.

[21] Appl. No.: 08/911,642

[22] Filed: Aug. 15, 1997

Related U.S. Application Data

[63] Continuation-in-part of application No. 08/705,247, Aug. 29, 1996.
[51] Int. Cl.$^7$ ...................................................... H05K 7/10
[52] U.S. Cl. ........................................... 708/100; 361/686
[58] Field of Search ..................................... 395/325, 800; 364/686, 683; 367/681; 312/265.3, 265.4, 265.6, 223.2; 392/390; 708/100

[56] References Cited

U.S. PATENT DOCUMENTS

| | | | |
|---|---|---|---|
| 5,264,992 | 11/1993 | Hogdahl et al. | 367/681 |
| 5,305,244 | 4/1994 | Newman et al. | 364/708.1 |
| 5,313,596 | 5/1994 | Swindler et al. | 395/325 |
| 5,384,686 | 1/1995 | Mesfin et al. | 361/686 |
| 5,708,840 | 1/1998 | Kikinis et al. | 395/800 |

*Primary Examiner*—Joseph E. Palys
*Assistant Examiner*—Omar A. Omar
*Attorney, Agent, or Firm*—James J. Ralabate

[57] ABSTRACT

A computer system is disclosed having two structures, a mobile core unit and an enclosure capable of enclosing and cooperating with the core unit. The core unit has all of the components of a general purpose computer except for a display and source of power. This core unit by itself is non-functional as a computer unless it is in electrical contact with the enclosure. The enclosure has several connector ports for attachment of peripherals to the system.

10 Claims, 5 Drawing Sheets

TRANSFERABLE CORE COMPUTER

This invention relates to a securable computer structure and more specifically to a transferable mobile core computer that can be used with compatible enclosures. This application is a continuation-in part of U.S. Ser. No. 08/705,247 filed Aug. 29, 1996.

BACKGROUND OF THE INVENTION

The parent application Ser. No. 08/705,247 discloses and claims a computer system comprising a base computer with a detachable self-contained mobile computer unit. The base computer and the mobile computer in that system each are fully functional when the mobile computer unit is detached from the base computer. Each of the base and mobile computers in the system of Ser. No. 08/705,247 have all of the components of a general purpose computer ("conventional computer") i.e. a processor, memory means, internal storage means, activation means, video display controller, input/output controller means, as well as external connector parts. Thus by "self contained" as used throughout this disclosure and claims is meant a general purpose conventional computer with conventional computer components (except for power and display) but when in an enclosure also has built-in capacity to interface with external sources of data and information. Also the self-contained core computer of this present invention has unique means to electrically connect to a plurality of equally unique different enclosures, such as other computers including mobile, laptop, or base computers, cars, appliances, televisions, home systems, such as alarms, electrical and heating systems, office units and equipment such as fax machines, copiers, telephones, dictating equipment and the like, or any other suitable enclosure. The core unit of this invention, while it has all of the components of a conventional computer, will not function as such unless it is attached to a mating enclosure.

In commonly owned U.S. Pat. No. 5,305,244 and U.S. patent application Ser. No. 08/538,194 and its continuation application (filed May 22, 1997) a mobile user supported computer apparatus is disclosed having means for attachment of the computer and display or just the display to a user. The user supported computer disclosed in these applications or patent is commercialized under the trademark "Mobile Assistant", which is a registered mark of Xybernaut Corporation of Fairfax, Va. The Mobile Assistant is very lightweight, versatile, efficient, can be attached to a user and is voice activated thereby leaving the user's hands free to repair or otherwise carry on the work being done.

There are known various systems for using removable modules for use in other computers or structures. These modules typically have only one function and are not a fully functional independent computer. Also known are removable dockable mobile computers that are fully functional computers that may be inserted onto a docking station to further enhance their functions. It is important to note that these prior art dockable computers are fully functional computers independent from and apart from their docking stations. Some of the systems are disclosed in U.S. Pat. Nos. 5,488,572; 5,526,493; 5,608,608; 5,627,974; 5,632,020; and various PCT publications WO 94/1637; WO 93/00627 and WO 90/11628. In U.S. Pat. No. 5,488,572 (Belmont) a notebook computer which is fully functional before docking is docked on a motorized expansion base unit. Before the docking event occurs, the notebook computer communicates with the expansion base unit via a sense signal. This notebook computer and docking station are specifically designed to work together and interact. The notebook computer is not a universal computer that can be used with other docking stations indiscriminately. In Belmont if the expansion base unit determines that the notebook computer is in a proper state for docking, it activates its motor to load the notebook computer. This is a very specifically designed system where the notebook computer and the docking station must be specifically structured to accept each other. The docking base unit cannot accept other computers not intended to be compatible therewith.

U.S. Pat. No. 5,526,493 (Shu) discloses another docking system for computer expansion. The Shu system relieves a computer user of the task of manually placing the portable computer in the suspend mode prior to docking with the docking station. Here again the portable computer 12 of Shu is a fully functional computer before docked with docking station 14.

U.S. Pat. No. 5,608,608 (Flint) discloses the use of two chassis and a cartridge having separate functional components that interface with one another over a common bus. Flint's cartridge has only a processor and memory combined to a second bus and at least one slot for housing a communication module that is coupled to a second bus. The cartridge is intended for use in laptops, notebook and sub-notebook computers. The cartridge of Flint does not process the functions generally required in a general purpose computer, specifically storage means for data, operating systems and software, and video display interface electronics, both of which are contained in the chassis of Flint, not the cartridge. Therefore, the cartridge is dependent on at least one of the two chassis for data retrieval, operating software, application software and video interface, all of which are needed for full functionality of the computer as a whole. As will be described later in this disclosure, the presently described invention contains all of the storage, processing, video interface, and software in the core unit, which allows this core to be used with any closed housing without concern for the version of operating software, application software or video setting. In Flint, these settings must all match properly for the computer to function. In addition, Flint requires three separate components (two chassis and the cartridge) while the invention herein requires only two components.

Watts U.S. Pat. No. 5,627,974 provides a computer docking system having connection means for connecting a portable computer to a docking station, and means for allowing a microprocessor in the docking station to talk to underlying software using the central processing unit of the portable computer. The portable computer of Watts is fully functional before and after docking; it can perform the usual computer functions without being docked.

Gephardt U.S. Pat. No. 5,632,020 discloses a dockable computer system capable of hot or warm docking, the bus arbiter grants exclusive non-preemptive access to the buses to the docking agent which is capable of quieting (rendering inactive) the bus of the portable computer and docking station in response to a notice signal. All of the PCT publications noted above disclose conventional inter-docking stations which accept a mobile computer to become with the mobile computer an active desktop computer unit.

None of the above prior art discloses the concept of a standardized mobile core unit that has universal usage in a plurality of standard enclosures.

SUMMARY OF THE INVENTION

It is therefore an object of this invention to provide a core computer unit devoid of the above noted disadvantages.

Another object of this invention is to provide a core unit that is transferable from one enclosure to another, while providing various levels of security.

A further object of this invention is to provide a self-contained uniquely designed core unit that will either continue to function in its current enclosure environment or can be used in an entirely new way in its second environment.

Still a further object of this invention is to provide a simple-to-use core unit adapted for easy use by the layman with little or no computer training.

A further object of this invention is to provide a self-contained uniquely designed core unit that will, when removed from the first enclosure and inserted into a second enclosure, either continue to operate in the same manner or operate in an entirely new way in its second enclosure environment.

Yet a further object of this invention is to provide a core computer unit that is easily removed from one enclosure to be inserted into a second different enclosure, or can be permanently installed in an enclosure.

A still further object of this invention is to provide a core computer unit that can operate in any enclosure or environment while maintaining security for the data.

Another object of this invention is to provide a portable computer core unit that can be uniquely designed so as to fit in any equally uniquely designed enclosure, such as office equipment, homes, cars, televisions, or other enclosures.

These and other objects of this invention are accomplished generally speaking by a transferable, removable and portable computer core unit, included in a single housing which is critical to this invention. The core unit of this invention is simple, uncomplicated and is carried in a single closed housing, only to be easily removed or inserted as a unit into a mating enclosure. The core unit of this invention has preferably only one uniquely configured connecting means which mates with or fits against a power connector source or activating means in an enclosure. Other than this connecting means, all of the components of the core unit are sealed and not removable from the core housing. This same connecting means also provides communication or transfer of information over a bus or in a wireless fashion. In the core unit all of the computer components stay intact unlike the prior art where for example the CPU is removed and replaced with a second CPU or other components. The security offered by the core unit is provided by uniquely structured mating connection means which connect to a mate connector in the enclosure. In the event that the core unit is lost or misplaced, it's data cannot be used, read or printed out by others because it can only be activated by connection to an equally unique mating connector in the enclosure. Also for security reasons, the core unit is in a completely closed housing so that no computer component may be removed, copied or tampered with. This feature is critical to this invention.

By "enclosure," "enclosed" or "enclosing" is meant throughout this disclosure and claims, that the core unit is connected or at least partially housed by the enclosure. By the term "communication activation means" is meant wireless transmission or communication, radio, cellular communication, and the like.

As above noted, the core unit of the present invention is entirely different than the computer devices of the prior art; in particular, the cartridge unit of U.S. Pat. No. 5,608,608 earlier discussed. U.S. Pat. No. 5,608,608 (Flint) discloses the use of two chassis and a cartridge having separate functional components that interface with one another over a common bus. Flint's cartridge has only a processor and memory combined to a second bus and at least one slot for housing a communication module that is coupled to a second bus. The cartridge is intended for use in laptops, notebook and sub-notebook computers. The cartridge of Flint does not process the functions generally required in a general purpose computer, specifically storage means for data, operating systems and software and video display interface electronics, both of which are contained in the chassis of Flint, not the cartridge.

Therefore, the cartridge of Flint is dependent on the two chassis for data retrieval, operating software application, software and video interface, all of which are needed for full functionality of the computer as a whole. As will be described later in this disclosure, the presently-described invention contains all of the storage, processing, video interface and software in the core unit which allows this core to be used with any housing without concern for the version of operating software, application software or video setting. In Flint, these settings must all match properly for the computer to function. In addition, Flint requires three separate components (two chassis and the cartridge) while the invention herein requires only two components. Furthermore, Flint allows the chassis to be user configurable whereas the core unit of the present invention does not.

Finally, the cartridge of Flint permits external peripheral devices or ports (e.g. PCMCIA) to be an integral part of the cartridge. Conversely, the present invention does not allow any peripheral devices or external peripheral ports to be integral in the core unit since it (core unit) has components in a completely closed housing thereby providing a secure tamper-proof core unit. The only communication with the interior components of the core unit is through its connection means.

The core unit of this invention is small, compact and self-contained. Each of the enclosures that the core unit can be inserted into can have its own set of distinct peripheral devices or peripheral connector ports for performing singular or multiple functions; for example, if a technician in a factory has the responsibility to perform inventory control, the core unit would be inserted into an enclosure that has connector ports that are specific to perform the inventory functions (e.g. port for a bar code scanner, and communications to a remote computer). If the same technician has the responsibility to repair and maintain equipment in that facility, the technician could remove the core unit from the inventory enclosure, insert the same core computer into a different enclosure that has, again, distinct peripheral devices or connector ports specific to performing maintenance functions (e.g. 1553 interface for performing non-intrusive testing of equipment, head mounted display port, and a digital multi-meter for taking electrical readings) and therefore function as a repair and maintenance computer. Additional security means can be inserted into the technician's core unit if security becomes important in use to allow only him or her access to enclosures or systems.

The same technician might also have an office and need access to, and operate from, a laptop computer. The core computer used in the above examples could also be inserted into a laptop enclosure where all peripheral connector ports, embedded peripheral devices (e.g. CD-ROM reader), and a means for providing power are in an enclosure that looks like a laptop. When the core unit is inserted into the laptop enclosure the unit would function as a traditional laptop.

The above examples show the versatility of the core computer to be used in a variety or different environments and situations without the need for three different computers to perform the various functions (inventory control device, test equipment and computer, and laptop computer).

By keeping the core unit and its interface standard, users can make one-time investment in the core computer and allow enclosures to dictate the function—likewise, functions or procedures differ from company to company, therefore a company can now determine what enclosure functions are necessary to perform their missions (e.g. inventory control, repair and maintenance, general office computers) and build their enclosures accordingly.

Each of the enclosures in which the core unit can be at least partially inserted into will have their own peripheral external connecting ports; for example, if the core unit is removed from an office located computer or other enclosure, it can be inserted into a console of a car where the console has externally connected ports to car functions to be monitored such as disability function for security, brakes, motor, transmission, telephone, geographical information systems, and the like. When the car is taken in for repairs, the core unit is simply removed and given to the mechanic who will then insert it into his diagnostic equipment with a suitable mating connector to determine the cause of the car problem. This would act in this instance as a "Black Box" (as used in airplanes) for cars and could also replicate a complete office environment. This same core unit can then be inserted, for example, into a home electrical control enclosure to regulate the on-off lights, air or heating system of the house. Naturally, the enclosures need to have special uniquely structured connector means so as to accept the core unit with a mating connector. Therefore, the special connector core unit of this invention can be used as a single portable unit that will supply or replace office computers, car computers that regulate the memory for security, information read out, seat's temperature, etc. Home regulators of light, heat, air, and t.v., and can be used as a total core computer insert to any mobile or stationary computer. The specially designed core computer unit of this invention can easily be carried from one enclosure to another and will operate in any environment. It is truly the universal-personal computer in that it can go wherever the user goes; to be used in whatever environment he or she finds themselves in. Each enclosure in a preferred embodiment will have its own display or monitor and power source; for example, the car enclosure can have a small display on the dashboard, a mobile wearable computer (such as the Mobile Assistant) can have a head, wrist mounted, shoulder or eyeglass mounted display, the home monitoring system can use the t.v. screen as a display, etc. Obviously, if desirable and suitable, the enclosure can be used without a display. The power source available in a car, home or mobile computer such as a battery or electrical system will be used to power the core unit of this invention. The core unit must be housed in a mating enclosure before it could function as a computer. The termed "housed" throughout this disclosure and claims means that the core unit is at least partially contained in said enclosure or in electrical or physical contact with the enclosure.

The components for the universal core unit of this invention can be similar to those disclosed in U.S. Pat. No. 5,305,244 which is incorporated by reference into this disclosure. The CPU, for example can be an 80286, 80386SX, 80486, or Pentium microprocessor available from Intel. The enclosures will include different interfaces and controllers for use with other types of peripherals such as Cardbus, other communication devices, or the like. Circuit cards such as those obtained from Dover Electronics Manufacturing of Longmont, Colo. and Ampro Computers of Sunnyvale, Calif. can be used in the core unit, if desired. If the core unit is voice activated, it could contain a voice-recognition engine available from Dragon Systems, Newton, Mass. used in connection with a sound card. Other components used in the core unit of this invention are off the shelf-presently available components such as those disclosed in U.S. Pat. No. 5,305,244 and U.S. patent application Ser. No. 08/538,194 and its continuation application filed May 22, 1997. The core unit is different in that it cannot operate as a computer until inserted into a special enclosure, which will only accept core units with a unique connector means, thus a very secure system may be provided.

The transferable and removable standardized core computer unit of this invention includes a single housing comprising therein standard features of a self-contained general purpose computer. The enclosure unit has at least one electrical connector means for connection to a bus connection and to a source of power outside the enclosure. It will only work off the source of power provided by or through an enclosure and will not function as a stand-alone unit if directly attached to a power source. The enclosure comprises peripheral connector ports or devices to cooperate with said core computer unit when said core unit is placed therein, and the core computer unit has means to cooperate with a plurality of different enclosures when inserted into said enclosures in either an original placement or transferred from another enclosure. The core computer unit has activation cooperation means for interaction with the desired activation means. The activation means are selected from the group consisting of audio activation means, communication activation means, pen activation means, brain activation means, eye-tracking activation means, mouse activation means, a keyboard activation means and mixtures thereof. The core unit has no removable components and will not function as a computer without said enclosure.

The core computer unit of this invention can be removed from a laptop enclosure and inserted into a mobile body worn enclosure to become thereby a mobile body-worn computer as another example of its use. This type of usage is important since the core unit of this invention can be interchangeably used in an infinite number of conforming enclosures with mating connector. Such an enclosure could have means to allow it to monitor all office functions, an enclosure(s) in a car, such as in the console in an arm rest or dashboard, an enclosure in an vehicle, an enclosure in a home appliance or a house system, such as an alarm or heating system or an electrical system, in an enclosure in test equipment, television, and the like. Each enclosure is specifically structured to accept the equally specifically structured core unit of this invention. Thus the same core unit can be used if desired in several mating enclosures in the same day or period. The core computer's memory and storage means can for example carry over a project from the office to the home to ensure continuity of a project, while as above noted providing optional security since it will only function in a properly mating enclosure and can employ a means that limits the specific enclosures that one, or one type of, core unit can operate with. The core unit can have such further security means included therewith. It (same core unit) can be used sequentially, for example, in the office, in the car while traveling home or at home. Each enclosure will have ports for various functions such as connection to a head set or display means. The core unit will comprise a CPU, memory means, internal non-volatile storage means, activation means, video, I/O interface and support circuitry. The core unit will not function as a computer unless it is in or on or in electrical contact with a specifically designed mating enclosure. The enclosure supplies the display when needed, the power supply (activation) for the core unit and provides the ports for peripheral external connections, such as connection to a display or printer. The enclosure and core unit have uniquely configured mating connection means for power and allowing communication of the core to the enclosure. The enclosures must rely upon the core for general computer functions. The enclosures supply to the system herein described, the power means and connections to peripherals, such as a display, sensors and controls, etc. The enclosures are inert as a general computing device until the core unit is inserted therein, but unlike the prior art docking systems, the core unit does not function or is activated apart from the enclosure and the core unit has all of the components of a conventional computer except a display and at least one connector to a direct power connection, and communication bus; it is always activated only by a unique connection or connections to an enclosure. This is critical to the present invention. By "conventional computer" is meant a single completely closed housing comprising a CPU, memory means, internal non-volatile storage means, activation means, video, I/O interface, support circuitry, and in this case a uniquely designed connector that also connects to an enclosure power source. The enclosure is always part of another structure (never alone) such as part of a computer, telephone or local network system, car, part of test equipment, part of the electrical system of a building, etc.; it never is a stand-alone enclosure, such as the prior art docking stations unless that docking station is ultimately connected to a second structure, i.e. car. The enclosure has a uniquely designed electrical connector that only fits or mates with the uniquely designed mating connector of the core unit, such a coupling, however, may take on a number of designs.

As noted above, the core unit and the enclosure must have unique or specially designed connectors to both function and for security reasons. There are many different unconventional connectors that can be used such as specially configured tongue and groove connectors, dove tail connectors, bar connectors, slot and projection connectors, etc. The more unique the communication or connectors, the better the security of the core unit. Obviously, any other security means may be incorporated into the system of this invention if desirable to further enhance the security of the system.

DETAILED DISCUSSION OF DRAWINGS AND PREFERRED EMBODIMENTS

Figure 1:
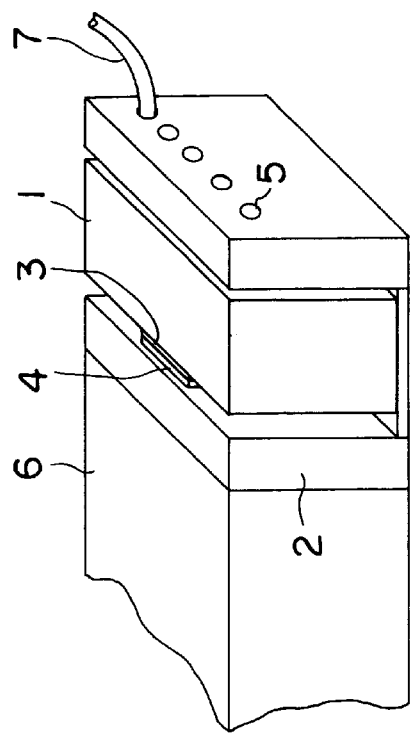
FIG. 1 is a perspective view of a core unit and enclosure before the core unit is inserted into the enclosure.
Figure 2:
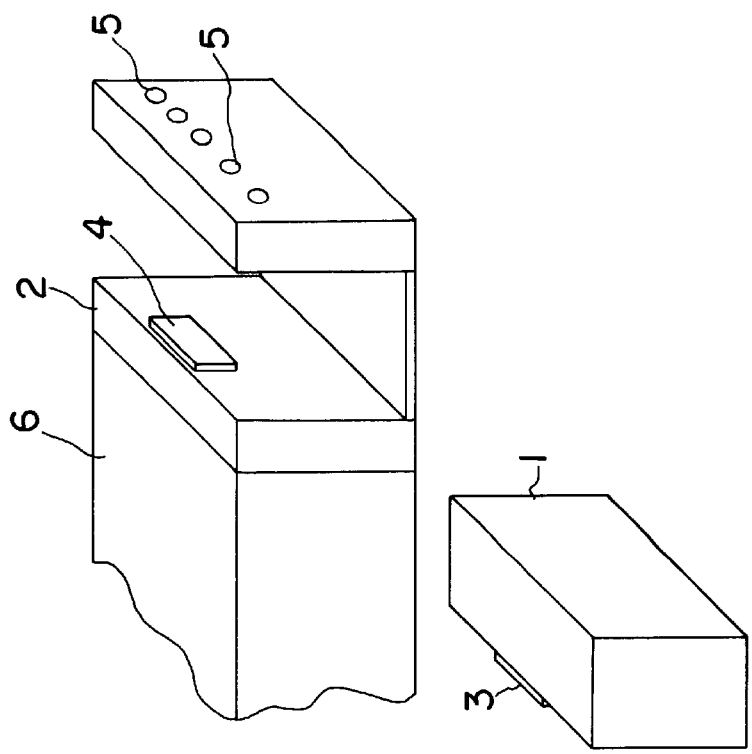
FIG. 2 is a perspective view of the core unit after insertion into the enclosure.

In FIG. 1 a core unit 1 is shown before it is inserted into an enclosure 2. As noted above, core unit 1 contains all of the components of a conventional computer except for a display. Also the core unit 1 will not function as a computer unless it is inserted into enclosure 2. By itself core unit 1 is totally inert and no information or data can be extracted therefrom unless it is mated with an enclosure with a compatible connector means. The connector means 3 of core unit 1 is a metal bar that can be configured in any design as long as it is compatible with the connector means 4 in the enclosure 2. For security reasons, the more unique mating connector means 3 and 4 are configured, the higher degree of security to the contents of core unit 1 will be afforded. The connector means in FIG. 1 are kept relatively simple in structure for illustration purposes only, i.e. to show how they mate with each other. Obviously customized connectors with one-of-a-kind structures with for example security codes would supply optimum security. The core unit 1 does not have its own display and must rely upon enclosure 2 to supply same. This is accomplished by peripheral ports 5 in any side of the enclosure 2; these ports connect to display means or any other extended connection required. The connections of the core unit 1 to these ports is not shown in the drawings for clarity purposes; any known conventional circuitry or electrical connections obviously can be used. The enclosure 2 is always connected either directly or indirectly to a structure 6 such as the console of a car, test equipment, house electrical system, other computers, etc. Once core unit 1 is in place as shown in FIG. 2, the electrical connector means 3 and 4 engage each other and the core unit 1 is now activated and will function as a computer unit with enclosure 2. As noted earlier, the only communication with the interior computer components of core unit 1 is through connector means 3. No PCMCIA or other ports are found in core unit 1. This is important to the present invention. A monitor or display is connected thereto by cables 7, other ports or interconnectors 5 in enclosure 2 can be used for connection to other peripheral functions. The core unit 1 shown in FIG. 1 if lost or misplaced would be useless to someone other than the owner of a matching enclosure 2. With customized connector means in the core 1 and enclosure 2 third parties would not gain access to information in core unit unless they also possessed similarly the matching enclosure(s). Security can be further enhanced under program control or by pre-programming before distribution. The core unit 1 by itself is inert as is the enclosure 2 by itself. A core unit 1 of a user is not interchangeable with a core unit 1 of another user; each is a customized design.

Figure 3:
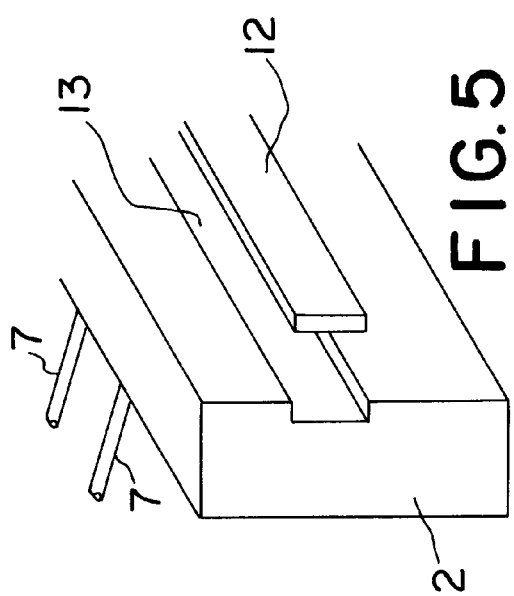
FIG. 3 is a perspective view of an embodiment of a unique type connector means in the core unit and enclosure.
Figure 4:
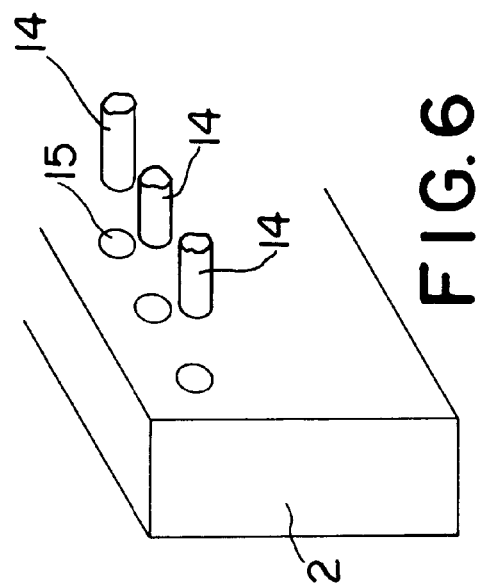
FIG. 4 is a perspective view of another type mating connectors in the core unit and enclosure.
Figure 5:
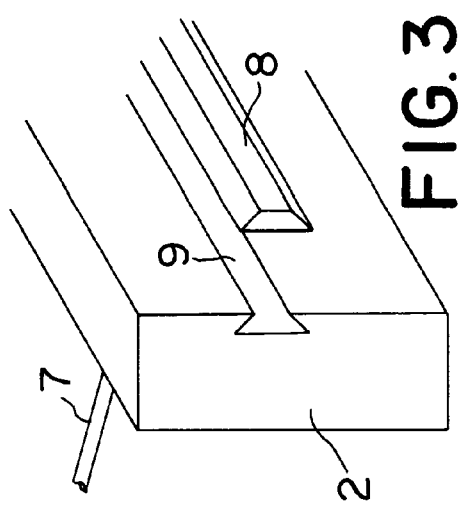
FIG. 5 is a perspective view of a different embodiment of mating connector means in the core unit and enclosure.
Figure 6:
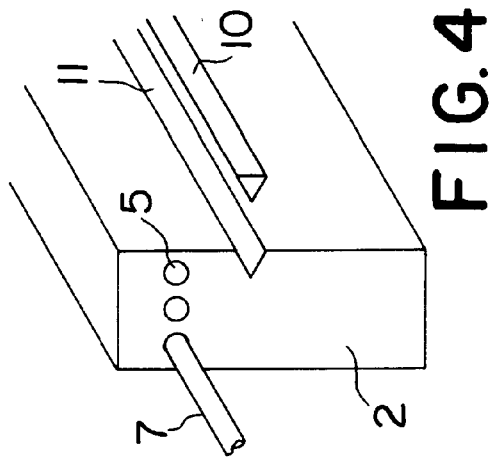
FIG. 6 is a perspective view of peg type core unit connector means with mating apertures in the enclosure.

In FIGS. 3–6 different configured connector means are shown; however, these are merely shown to illustrate—not limit the concept. A power source cord or other means 33 is shown in electrical contact with each enclosure 2. In FIG. 3 a dove-tail connector 8 is shown that would be attached to core unit 1 and would slide into dove-tail recess 9 of enclosure 2 when core unit 1 is inserted into enclosure 2 as shown in FIG. 2. The ports 5 can be located in any side of enclosure 2; for example, in FIG. 3 the ports 5 are located in a back section of enclosure 2 whereas in FIG. 4 the ports 5 are located in a front side section of enclosure 2. In FIG. 4 a triangular connector 10 of a core unit 1 will fit into a triangular slot or recess 11 in enclosure 2. All of the electrical connectors shown in all of the FIGS. 1–6 are conductive connectors used to activate the computer functions of core unit 1. Unit 1 can have activable activating means as described in parent application Ser. No. 08/705,247, the disclosure of which is incorporated by reference into this application. Once activated, readout of data or information from core unit (or print out) can be accomplished by cable connectors 7 that can be connected to a monitor, printer or any other desired structure. Each of the connectors of FIGS. 3–6 obviously are attached to a core unit 1 which is not shown in FIGS. 3–6 for clarity. These connectors should extend from the side of unit 1 similar to the connector 3 of FIG. 1. In FIG. 5 a core unit rectangular connector 12 is shown as it will fit into a rectangular slot 13 in the inner face of enclosure 2. All of the slots or recesses have conductive linings so that there would be electrical communication when each core unit connector is inserted therein. In FIG. 6 another embodiment of matching unique connectors is illustrated where peg-like metallic or other conductive connectors 14 which would be attached to core unit 1 are ready to be inserted into mating conductive apparatus 15 located in enclosure 2. While uniquely configured connectors are highly preferred for security of core unit 1 contents, obviously conventional connectors may be used together with or in lieu of one-of-a-kind type connectors, if desirable. In that case, security may be compromised and interchangeable conventional connectors would allow more universal usage. In each case, the enclosure 2 as noted earlier is part of a larger structure 6 such as an airplane, home, car, office equipment, medical or other test equipment and any other structures where private data communication is desired.

Unlike prior art systems where interchangeable modules usually containing only one primary module function are known, in the present invention core unit 1 is a completely fully functional computer without a display and power supply which is inert until combined with an enclosure(s) 2. The capacity and speed of each core unit can be made compatible with the state-of-the-art computer science as with the enclosures used. The present invention provides a system unobvious over the prior art computer docking station art where the computer being docked (in prior art) is fully functional apart from or in docked state. The computer core unit 1 is never functional until inserted into the enclosure 2. Any system or activation means of co-pending application 08/861,598 may be used in the present invention. The disclosure of 08/861,598 is incorporated by reference into this application.

Figure 7:
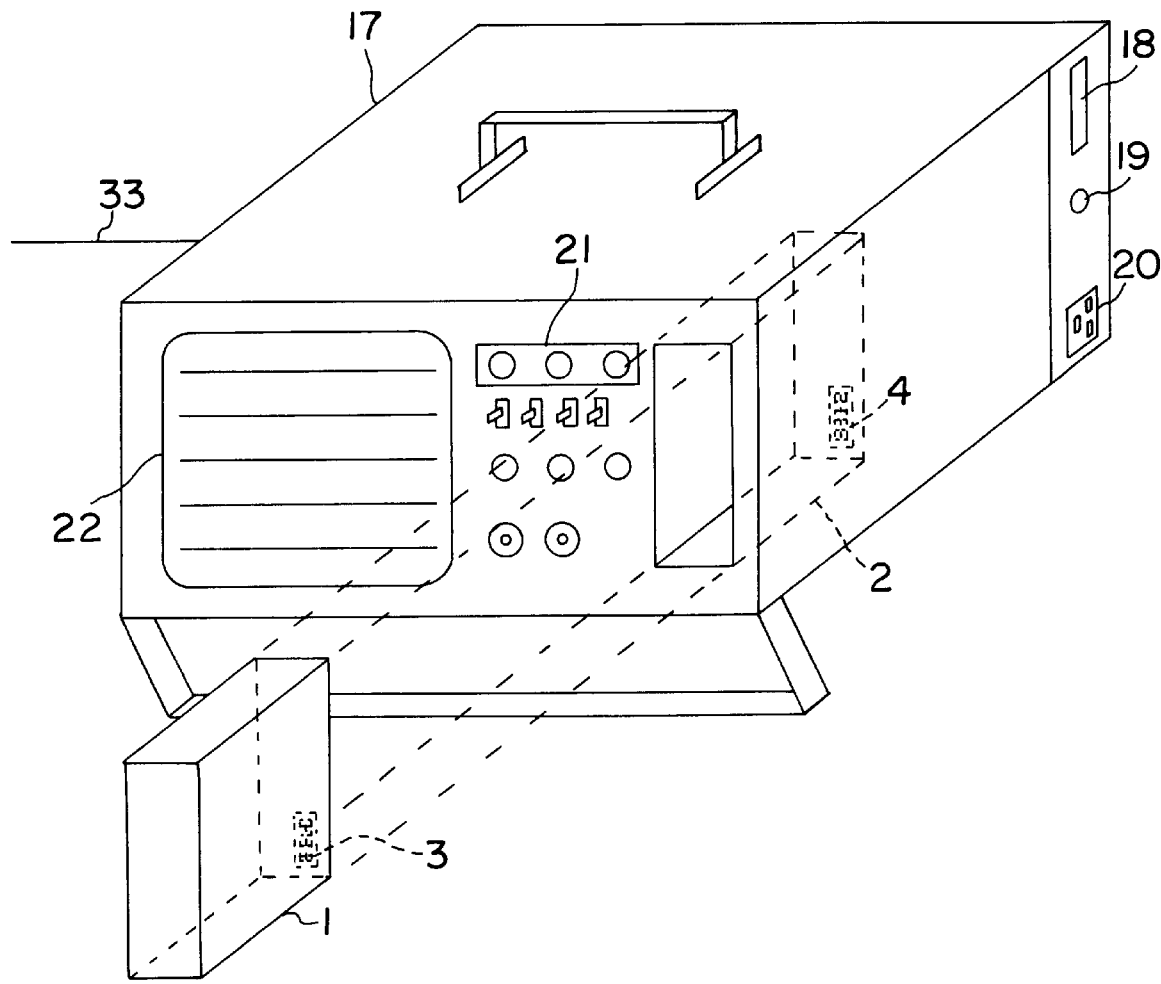
FIG. 7 is a perspective view of an enclosure, which is part of a piece of test equipment of any kind. Also illustrated is a mating core unit.

In FIG. 7 a piece of medical, analytical, mechanical, electrical, or any other test equipment 17 is shown having port 18 for connection to a printer, port 19 for connection to a multimeter reader, and outlet 20 for connection to a source of power. A mating core unit 1 is shown before it is inserted into enclosure 2. Note that the core connector means 3 is located on the front side of the totally enclosed core unit housing. Once inserted into enclosure 2, the connector means 3 will make and maintain contact with enclosure connector 4, thereby supplying the power to run the computer of core unit 1. Also connection of core 1 and enclosure 2 provides communication or transfer of information over a bus located in the enclosure 2. The test equipment 17 has a monitor 22 and controls 21. As earlier stated, the test equipment 17 can be of any type. The user can customize the connectors 3 and 4 so that they are unique and test results (for example, medical) can be maintained confidential.

Figure 8:
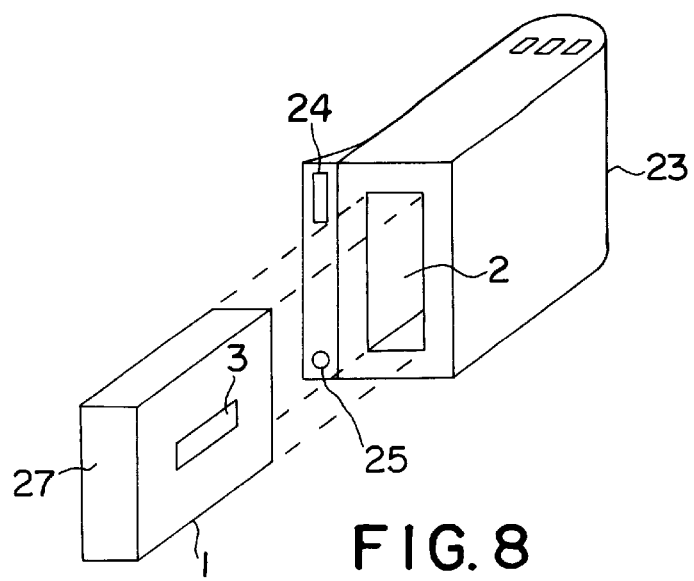
FIG. 8 is a perspective view of an enclosure, which is part of a wearable computer such as the Mobile Assistant; also shown is a mating core unit.

In FIG. 8 a wearable computer 23 such as the Mobile Assistant can have an enclosure 2 integral therewith. The computer 23 by itself will not function as a computer until and unless the core unit 1 is inserted therein in electrical contact with the enclosure 2. A power port 25 is located in computer 23 for connection to a battery. A uniquely configured core unit connector 3 is shown on the longitudinal side of core unit 1; however, the connectors 3 and 4 can be located on any portion of core housing and enclosure 2. A port 24 is provided in mobile computer 23 for connection to a monitor or display.

Figure 9:
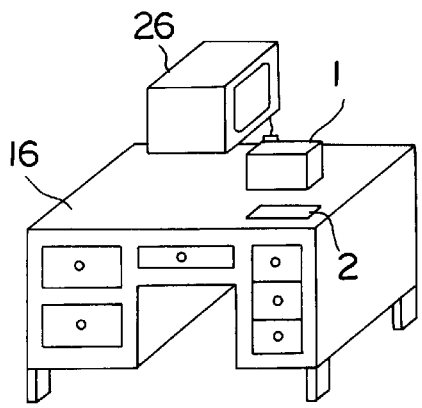
FIG. 9 is a perspective view of an enclosure, which is part of a desk; also shown is a mating core unit.

In FIG. 9 a desk 16 is illustrated having a built-in enclosure 2 located at any convenient part of desk 16. The desk 16 is provided with a monitor 26, which will be functional upon activation of the core unit and enclosure system. The office worker may need to later transfer the core unit 1 from desk 16 to a laptop or to the mobile computer of FIG. 8. He or she can continue their desk work contained in core 1 in their car or in a mobile computer 23 by using the same core unit 1 upon transferring it from desk enclosure 2 to mobile computer enclosure 2. Or, core unit 1 once removed from desk enclosure 2 can be used in a totally new and different environment when used in a car or in mobile computer 23.

Figure 10:
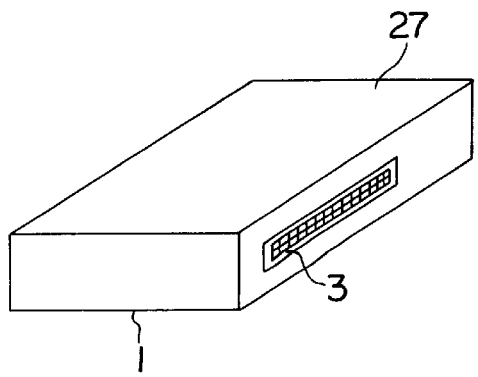
FIG. 10 is a perspective view of a core unit showing fully the power and bus connector means, which will mate with a connector means of an enclosure.

FIG. 10 illustrates a completely enclosed unit housing 27, having only one communication means 3 to other structures. As earlier noted, the connector means 3 can be on any external portion of unit housing 27 of unit 1. Connector 3 is connected to a connector 4 in the enclosure 2 for power and bus connection between the two components 1 and 2. It is important that no computer component is removable from unit 1.

Figure 11:
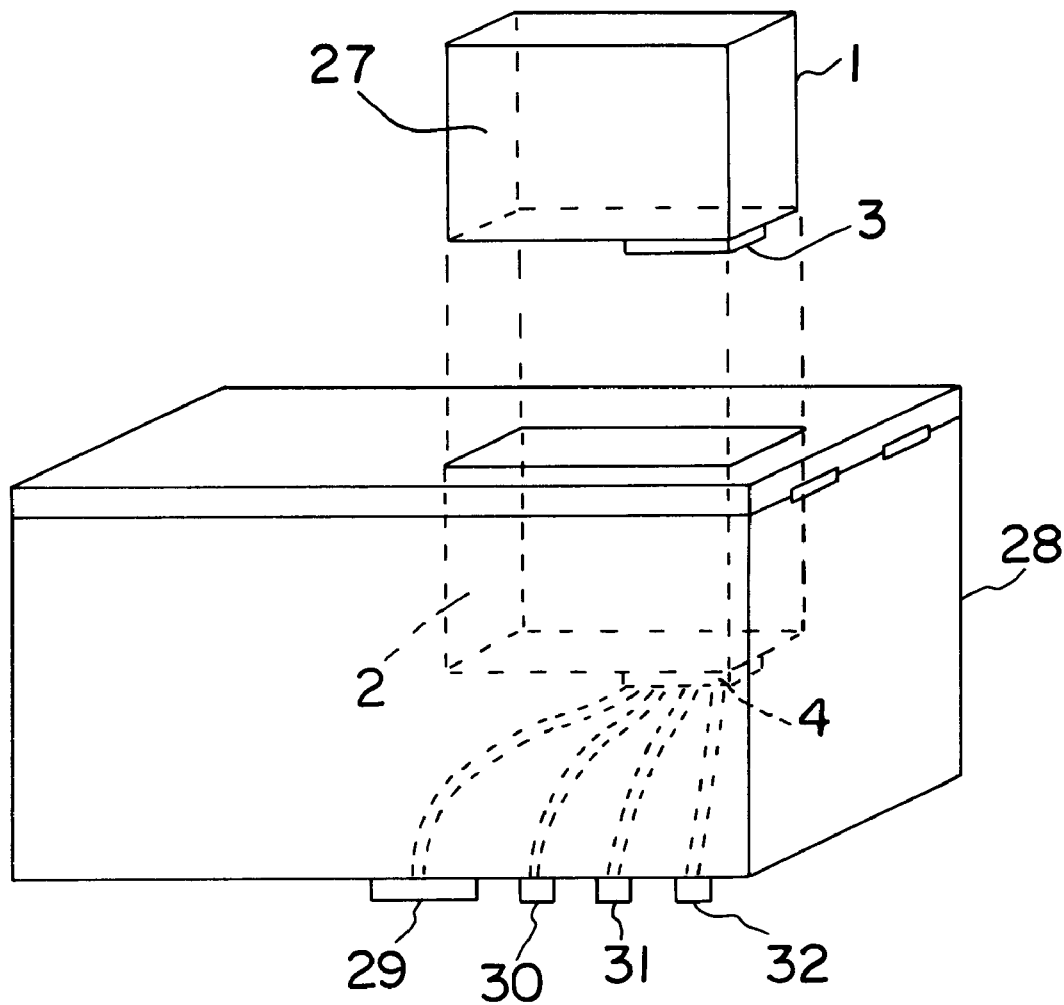
FIG. 11 is a perspective view of an enclosure which is part of the arm rest of a car or other vehicle; the enclosure having various parts to other car functions.

The illustration of FIG. 11 shows a core unit 1 before it is inserted into an enclosure 2 located in the arm rest, console, dashboard, or any other section 28 of a car or vehicle. Here the connector 3 is located on the bottom of totally enclosed core unit housing 27. The armrest 28 (or other car portion) has ports 29, 30, 31, and 32 for connection to the car's sensors, GPS, display and car communication system, such as cellular phone. The core unit 1 can monitor any and all functions of the car and yet can be removed and used in a desk in a completely different environment. Shown in FIG. 11 are electrical wires or cables extending from connector 4 to ports 29, 30, 31, and 32. These ports in enclosure or armrest 28 provides means for the various port functions to interact with the core unit 1 via connector 3 (in core) and connector 4 (in enclosure) once core unit 1 is inserted into enclosure 2. After said insertion core unit 1 is activated by the contact of connectors 3 and 4.

The preferred and optimumly preferred embodiments of the present invention have been described herein and shown in the accompanying drawings to illustrate the underlying principles of the invention, but it is to be understood that numerous modifications and ramifications may be made without departing from the spirit and scope of this invention.

We claim:

1. A computer system comprising at least two separate compatible structures, a first structure or core unit and a second structure or enclosure, at least one first structure or core unit being a single completely closed housing having internally therein components of a fully functional conventional general purpose computer including internal non-volatile mass storage means, said first structure not originally being an integral component of a computer but a free standing independent structure, said first structure or core unit not functional as a computer when standing alone, said first structure having means for connection to said second structure or enclosure, said first structure having means to retain stored information, even when separated from said second structure, said first structure devoid of any ports while only said second structure comprises peripheral connector ports to cooperate with said first structure, said first structure having means to be used with totally new and different type structured enclosures than said second structure, neither said first nor second structure operable as a computer without combination or electrical contact with the other, wherein all of said components in said core housing are completely enclosed therein and may not be removed, and wherein said second structure is always a part of another third structure.

2. The system of claim 1 wherein said first structure has means for connection with a mobile user supported computer.

3. The core computer unit of claim 1 wherein said unit has means via said enclosure to communicate with a function selected from the group consisting of a U.S.B., communication serial ports, floppy discs, video graphic adapters, P.C.I. Bus, display means, audio input/output means, power means, IRDA means, PCMCIA cards, activation means and mixtures thereof.

4. The core computer unit of claim 1 wherein said unit has means via said enclosure to communicate with PCMCIA cards connected to said enclosure.

5. The core computer unit of claim 1 wherein said unit has means via said enclosure to communicate with and function off an activation means selected from the group consisting of mouse activation, keyboard, audio activation, eye tracking activation means, pen activation means, electroencephalography activation means and mixtures thereof.

6. The core computer unit of claim 1 wherein said unit has means for communicating with ports located in said enclosure.

7. The core computer unit of claim 1 wherein said power connection means comprises a connector in electrical connection to all of said internal core components and having means for only mating with a compatible connector means for said enclosure, each of said power connection means and connector means for said enclosure being specifically structured to only function with each other.

8. The core computer unit of claim 1 wherein said core computer unit has means when connected to said enclosure to provide built-in capacity to interface with external sources of data and information.

9. The core computer unit of claim 1 wherein said core housing permanently encloses a processor, memory means, internal storage means, activation means, video display controller means, input/output controller means, and means for communication with outside sources of data and information.

10. A computer system comprising at least two separate compatible structures, a first structure or core unit and a second structure or enclosure, at least one first structure or core unit being a single completely closed housing having internally therein components of a fully functional conventional general purpose computer including internal non-volatile mass storage means, said first structure not originally being an integral component of a computer but a free standing independent structure, said first structure or core unit not functional as a computer when standing alone, said first structure having means for connection to said second structure or enclosure, said first structure having means to retain stored information, even when separated from said second structure, said first structure devoid of any ports while only said second structure comprises peripheral connector ports to cooperate with said first structure, said first structure having means to be used with totally new and different type structured enclosures than said second structure, neither said first nor second structure operable as a computer without combination or electrical contact with the other end and wherein all of said components in said core housing are completely enclosed therein and may not be removed, wherein said second structure is always a part of another third structure and wherein said third structure is selected from the group consisting of an airplane, a home, a vehicle, a car, office equipment, medical or other test equipment, other structures where private data communication is desired, and mixtures thereof.

* * * * *